United States Patent
Otey et al.

(10) Patent No.: US 11,934,731 B1
(45) Date of Patent: Mar. 19, 2024

(54) ALTERNATIVE MEDIA GENERATION MECHANISM

(71) Applicants: Ned Otey, Boulder, CO (US); David Stokes, Boulder, CO (US)

(72) Inventors: Ned Otey, Boulder, CO (US); David Stokes, Boulder, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 18/180,908

(22) Filed: Mar. 9, 2023

(51) Int. Cl.
G06F 3/12 (2006.01)

(52) U.S. Cl.
CPC .......... G06F 3/1275 (2013.01); G06F 3/1206 (2013.01); G06F 3/1253 (2013.01); G06F 3/1285 (2013.01)

(58) Field of Classification Search
None
See application file for complete search history.

(56) References Cited

U.S. PATENT DOCUMENTS

| | | | |
|---|---|---|---|
| 8,397,162 B2 | 3/2013 | Eller et al. | |
| 8,643,903 B2 | 2/2014 | Ohsugi | |
| 8,902,469 B2 | 12/2014 | Sanuki | |
| 9,126,440 B1 | 9/2015 | Lotz et al. | |
| 10,212,301 B2 | 2/2019 | Hirai | |
| 11,360,717 B2 | 5/2022 | Liebelt et al. | |
| 2015/0261488 A1* | 9/2015 | Aoki | G06F 3/1211 358/1.15 |
| 2016/0103637 A1* | 4/2016 | Matsui | G06F 3/1205 358/1.18 |
| 2016/0259606 A1* | 9/2016 | Aoki | G06F 3/1282 |
| 2018/0181349 A1* | 6/2018 | Condon | G06F 3/1222 |
| 2019/0272128 A1 | 9/2019 | Koets et al. | |
| 2019/0272133 A1* | 9/2019 | Liebelt | G06F 3/1282 |
| 2023/0085689 A1* | 3/2023 | Togashi | G06F 3/1234 358/1.15 |

OTHER PUBLICATIONS

IBM, "Page Printer Formatting Aid Version 1, Release 1.0", downloaded from https://www-40.IBM.com/servers/resourcelink/svc00100.nsf/pages/zOSV2R3S5445284/$file/ib6pug13.pdf, publication date is unknown.

* cited by examiner

*Primary Examiner* — Henok Shiferaw
(74) *Attorney, Agent, or Firm* — Jaffery Watson Mendonsa & Hamilton LLP

(57) ABSTRACT

A system to is described. The system includes at least one physical memory device to store print workflow manager and one or more processors coupled with the at least one physical memory devices to execute the print workflow manager receive a print job including print data to be printed, wherein the print data comprises a first presentation format, convert the received print data from the first presentation format to generate second print data in a second presentation format, duplicate the second print data to generate third print data, process the second print data to generate data to be printed to a first page size and process the third print data to generate data to be printed to a second page size.

20 Claims, 9 Drawing Sheets

US 11,934,731 B1

ALTERNATIVE MEDIA GENERATION MECHANISM

FIELD

This invention relates generally to the field of print services. More particularly, the invention relates to processing print jobs.

BACKGROUND

Entities with substantial printing demands typically implement a high-speed production printer for volume printing (e.g., one hundred pages per minute or more). Production printers may include continuous-forms printers that print on a web of print media stored on a large roll. A production printer typically includes a localized print controller that controls the overall operation of the printing system, and a print engine that includes one or more printhead assemblies, where each assembly includes a printhead controller and a printhead (or array of printheads). Production printers typically implement duplex printing to enable automatic printing on both sides of a sheet of paper.

Commercial printers have increasingly been requested to provide documents for the vision impaired in order to comply with Americans with Disabilities Act (ADA) requirements. For example, such requirements may include enlarging print to the equivalent of an 18 point font size, which is twice the standard 9 point font size. Moreover, large and current regular-sized pages must both be included in the documents. Thus, the large and regular pages must be managed and printed as a single print job.

Accordingly, a mechanism to include large and regular pages within a print job is desired.

SUMMARY

In one embodiment, a system is disclosed. The system includes at least one physical memory device to store print workflow manager and one or more processors coupled with the at least one physical memory devices to execute the print workflow manager receive a print job including print data to be printed, wherein the print data comprises a first presentation format, convert the received print data from the first presentation format to generate second print data in a second presentation format, duplicate the second print data to generate third print data, process the second print data to generate data to be printed to a first page size and process the third print data to generate data to be printed to a second page size.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

A mechanism to generate a print job having alternative media sizes is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "interface", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
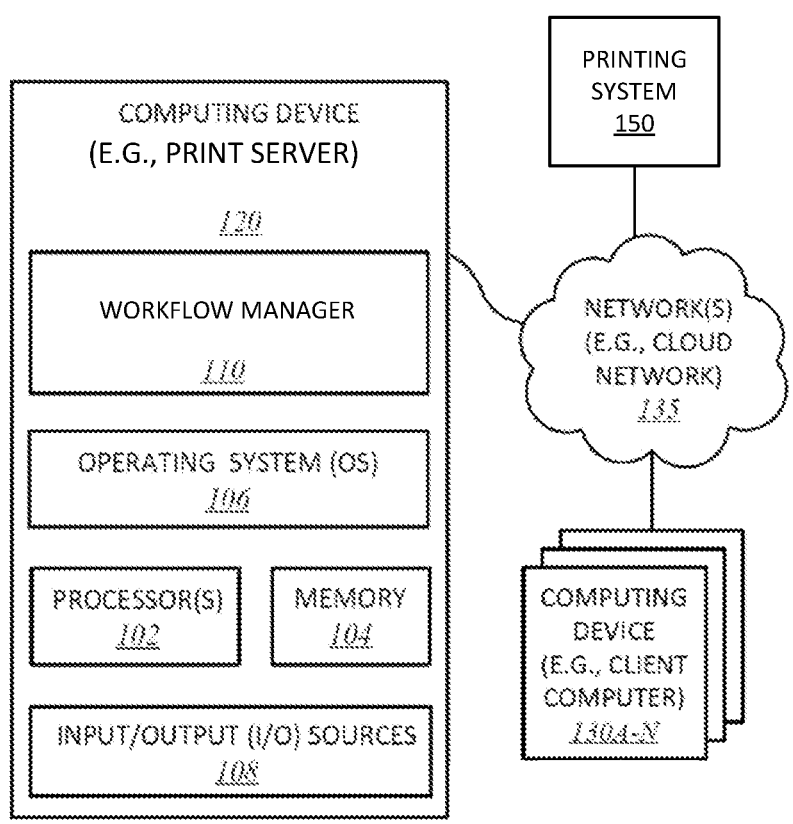
FIG. 1 illustrates one embodiment of a system having a computing device employing a workflow manager.

FIG. 1 illustrates a system 100 having a computing device 120 employing a workflow manager 110. In such an embodiment, computing device 120 comprises a print server computer serving as a host machine for employing workflow manager 110 to manage print workflows received from one or more computing devices 130 for printing at printing system 110.

In one embodiment, computing device 120 includes an operating system ("OS") 106 serving as an interface between one or more hardware/physical resources of computing device 120, one or more client devices 130 (e.g., 130A-130N) and a printing system 150 via a network 135. Computing device 120 further includes processor(s) 102, memory 104, input/output ("I/O") sources 108, such as touchscreens, touch panels, touch pads, virtual or regular keyboards, virtual or regular mice, etc.

Figure 2:
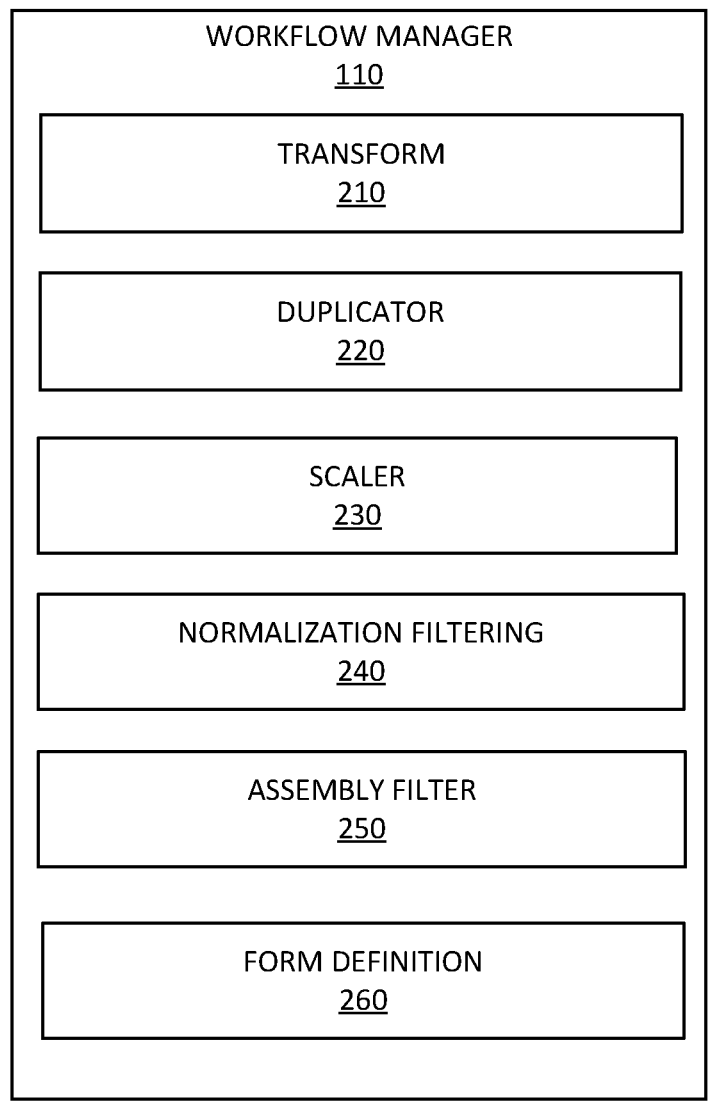
FIG. 2 illustrates one embodiment of a workflow manager.
Figure 3:
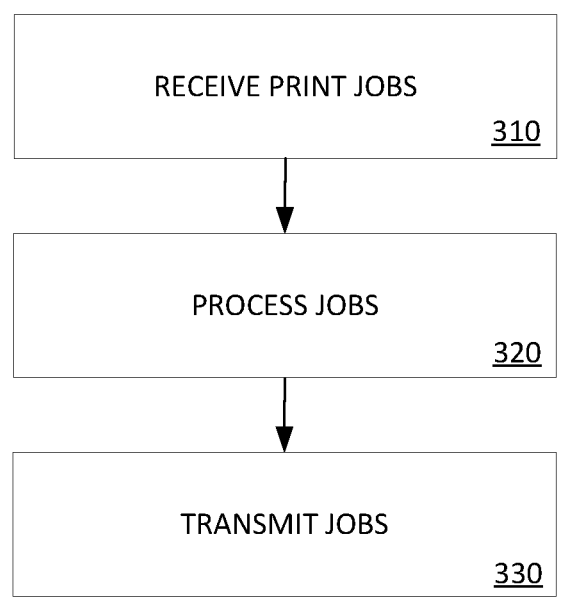
FIG. 3 is a flow diagram illustrating one embodiment of a method for performing a print workflow.

FIG. 2 illustrates one embodiment of workflow manager 110 to perform a print workflow. FIG. 3 is a flow diagram illustrating one embodiment of a process for performing a print workflow. At processing block 310, a print file including one or more print jobs (e.g., in an Advanced Function Presentation (AFP) format) is received. At processing block 320, the print jobs are processed. In one embodiment, the processing includes generating pages of multiple sizes and assembling the pages into a single document, as will be discussed in detail below. At processing block 330, the jobs are transmitted to printing system 150 at which print data included in the print jobs are applied to a medium (e.g., paper). As used herein a print job is defined as print data comprising data used by a printer (e.g., print engine 458) to print data to a medium. In embodiments, print data may comprise components (or objects used to print text, images, graphics, bar codes, etc.) and resources (e.g., page segments, overlays, fonts, form definitions, and page definitions). In further embodiments, print data may be comprised of a data file (or print file) that may be transmitted between computer systems.

Figure 4:
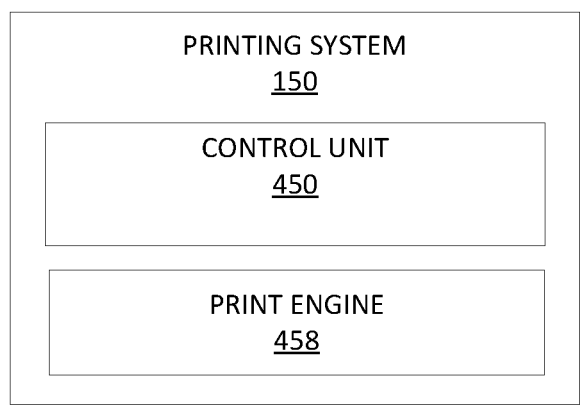
FIG. 4 illustrates one embodiment of a printing system.

FIG. 4 illustrates one embodiment of a printing system 150. Printing system 150 includes a control unit 450 and a print engine 458. According to one embodiment, control unit 450 processes and renders objects received in print job data and provides sheet maps for printing to print engine 458. Control unit (e.g., DFE or digital front end) 450 is implemented to process image objects received at control unit 450 by a raster image processor (RIP) to convert an image described in a vector graphics format (e.g., shapes) into a raster image (e.g., pixels) that is to be stored as scan line data in a memory array (not shown) for output to print engine 458.

As discussed above, there are instances in which documents that comprise both pages having a first (or regular) page size including standard sized font and objects, and pages having a second (or large) page size including an enlarged version of the same content, must be managed and printed as a single print job. A conventional mechanism to integrate large and regular size pages combines the pages (e.g., with a buckle folder and support enclosure) post printing in flat envelopes to be mailed. In such a mechanism, the regular pages are printed and tracked in separate print jobs. However, the process of printing separate print jobs and subsequently merging the jobs is inefficient.

According to one embodiment, a mechanism is provided to combine large and medium size pages during a print workflow. Referring back to FIG. 2, workflow manager 110 includes components that are implemented in the workflow to generate a print job having large and regular pages and assembling the pages to combine the large and regular pages into a single document. As shown in FIG. 2, workflow manager 110 includes transform 210, duplicator logic 220, scaler 230, normalization filter 240, assembly filter 250 and form definition logic 260.

In one embodiment, transform 210 receives print job including print data in a first presentation format and converts the print data to a second presentation format. In such an embodiment, the print data may be received as Advanced Function Presentation (AFP) print data and converted to a portable document format (PDF). AFT is a presentation architecture and family of associated printer software and hardware that provides for document and information presentation independent of specific applications and devices. In a further embodiment, transform 210 may be implemented using an AFP to PDF conversion tool. Although described herein with reference to AFP and PDF, other embodiments may implement different format types (e.g., page description language (PDL), Mixed Object:Document Content Architecture (MO:DCA), etc.).

According to one embodiment, the AFP print data received at workflow manager 110 (or original print data) specifies a format (e.g., primary format) that indicates that multiple pages are to be printed on a single sheet (e.g., an n-up format) of a print medium. In a further embodiment, the original print data also may also specify a format that indicates that pages are to be printed to both sides (e.g., front and back) of the print medium. In such embodiments, the format includes page 1 on the front and top page of a sheet of a document (e.g., booklet), with unused areas of a sheet left blank.

Duplication logic 210 receives the converted PDF print data and duplicates the print data to generate secondary print data in addition to the primary print data from which it was generated. In one embodiment, the primary (or regular) print data is processed to generate regular pages (e.g., regular page processing), while the secondary (or large) print data is processed to generate large pages (e.g., large page processing). In one embodiment, the print job data is duplicated by performing a file copy operation on an original print data file.

For large page processing, scaler 230 magnifies the scaling of print data in the large page print data prior to transform 210 to convert the large page print data from the second presentation format back to the first presentation format. In one embodiment, text and object data in the large page print data is scaled two hundred percent (200%) (e.g., from a standard 9 point font size to a 18 point font size) by performing a PDF scaling operation.

For regular page processing, transform 210 converts the regular page print data from the second presentation format back to the first presentation format without scaling being performed. In this embodiment, the conversion of the original print data from the first presentation format to the second presentation format back and back to the first presentation format is performed to facilitate the scaling of the large page print data because the scaling operation is achieved more efficiently in the second presentation format.

In one embodiment, the print data in the regular page print data includes blank pages that are inserted as electronic inserts. Thus, for processing of the primary page print data a normalization filter 240 is implemented to remove the blank page inserts from the regular page print data. Electronic inserts (or onserts) enables the electronic addition of content to a document after composition, which may be printed with the print job.

In addition, filter 240 inserts blank pages to each document sheet that is to printed to ensure the page count is a multiple of 2n, where in equals the number of pages printed to each document sheet. Thus, for a 4-up page format filter 240 adds blank pages for each document sheet that includes less than 8 printed pages. The addition of blank pages is implemented in roll-to-roll printing environments (e.g., in which the print order is backwards relative to reading order) to ensure a correct page-to-partition placement of pages. For example, page 1 from a reader's perspective is the last page in a document sheet from a print and AFP file perspective. Accordingly, this page must map to the bottom-right partition on the back of the document sheet. This can only be assured if there are 8 explicit pages to fill the other partitions.

Figure 5A:
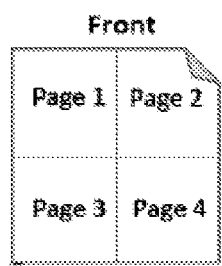
FIGS. 5A-5C illustrates embodiments of print documents having different media sizes.
Figure 5A:
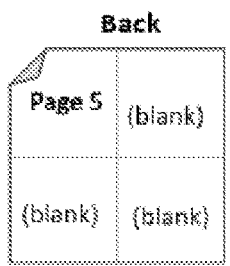
Figure 5A:
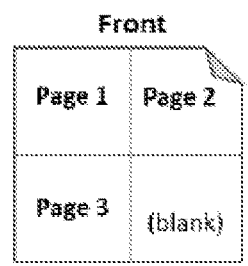
Figure 5A:
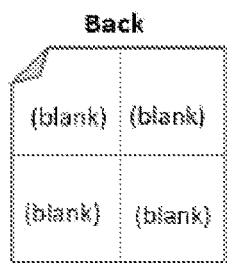
Figure 5B:
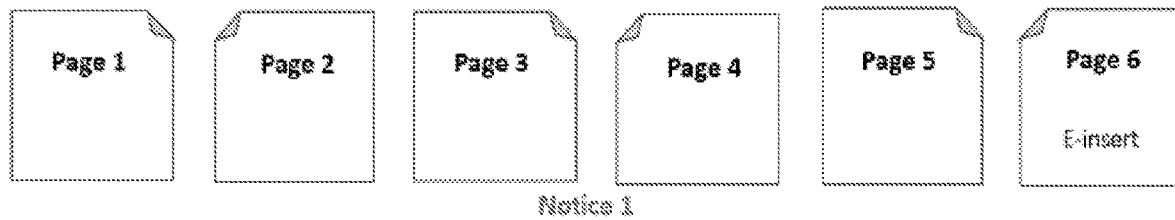
Figure 5B:
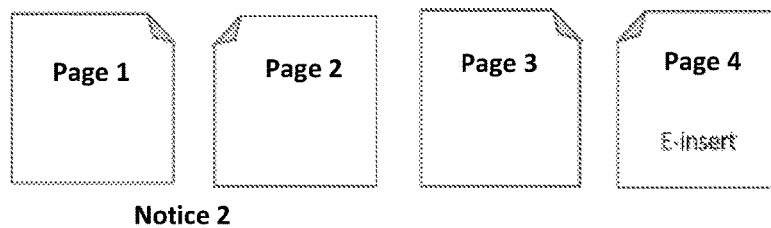

FIGS. 5A and 5B illustrate embodiments of notices of document sheets generated from primary page print data and large page print data formats, respectively. As shown in FIG. 5A, document notices 1 and 2 each comprise multiple pages printed on the front and back of a sheet of a booklet, with areas not having a page of print data being left blank. FIG. 5B illustrates the enlarged pages associated with notices 1 and 2, which have been printed in a 1-up duplex format. The enlarged pages in each notice includes blank page insert (e.g., pages 6 and 4).

Referring back to FIG. 2, assembly filter 250 receives the large page print data, the regular page print data, and the original print data and performs a final assembly filter operation to assemble the large and regular pages into a final document including the regular and large print formats. In one embodiment, the original AFP print data is used to manage the assembly of the document pages. In such an embodiment, the original print data includes page group structured fields, which are not included in the large page print data or the regular page print data (e.g., due to being removed during the conversion by transform 210), that are implemented to determine the boundaries of (or delimit) individual documents.

In one embodiment, the page group structured fields provide information during the assembly process as to the quantity of pages that are to be include in each document being printed. In such an embodiment, the page group structured fields comprise begin named page group (BNG) and end named page group (ENG), that are implemented to delimit each document specified in the AFP programming reference.

According to one embodiment, assembly filter 250 assembles each individual document by sequentially retrieving large pages from the large page print data and the regular pages from the regular page print data and generates an output print data. In a further embodiment, a mapping structured field may be included between the groups of large pages and regular pages. In such an embodiment, the mapping structured field comprises an Invoke Medium Map (IMM) structured field are included at the boundaries between groups of large and regular pages to switch between a 1-up and 4-up layout.

Assembly filter 250 further inserts the page group structured fields into the output print data to delimit boundaries, as per the original AFP file. Form definition logic 260 inserts a form definition (formdef) inline in the output print data that includes two medium maps (e.g., a 1-up duplex MM for the large pages and a 4-up duplex MM for the regular pages). In one embodiment, the formdef uses known MM names that are referred to by the IMMs inserted into the output print data by assembly filter 250.

Figure 5C:
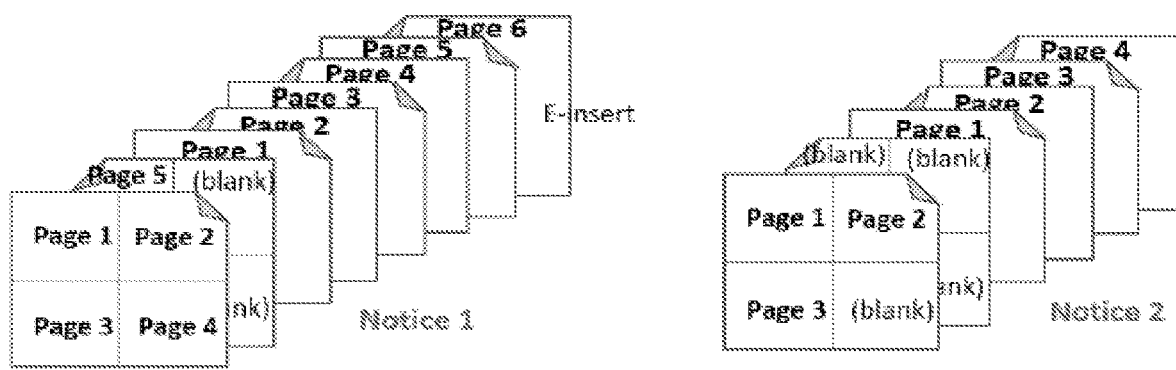
Figure 6:
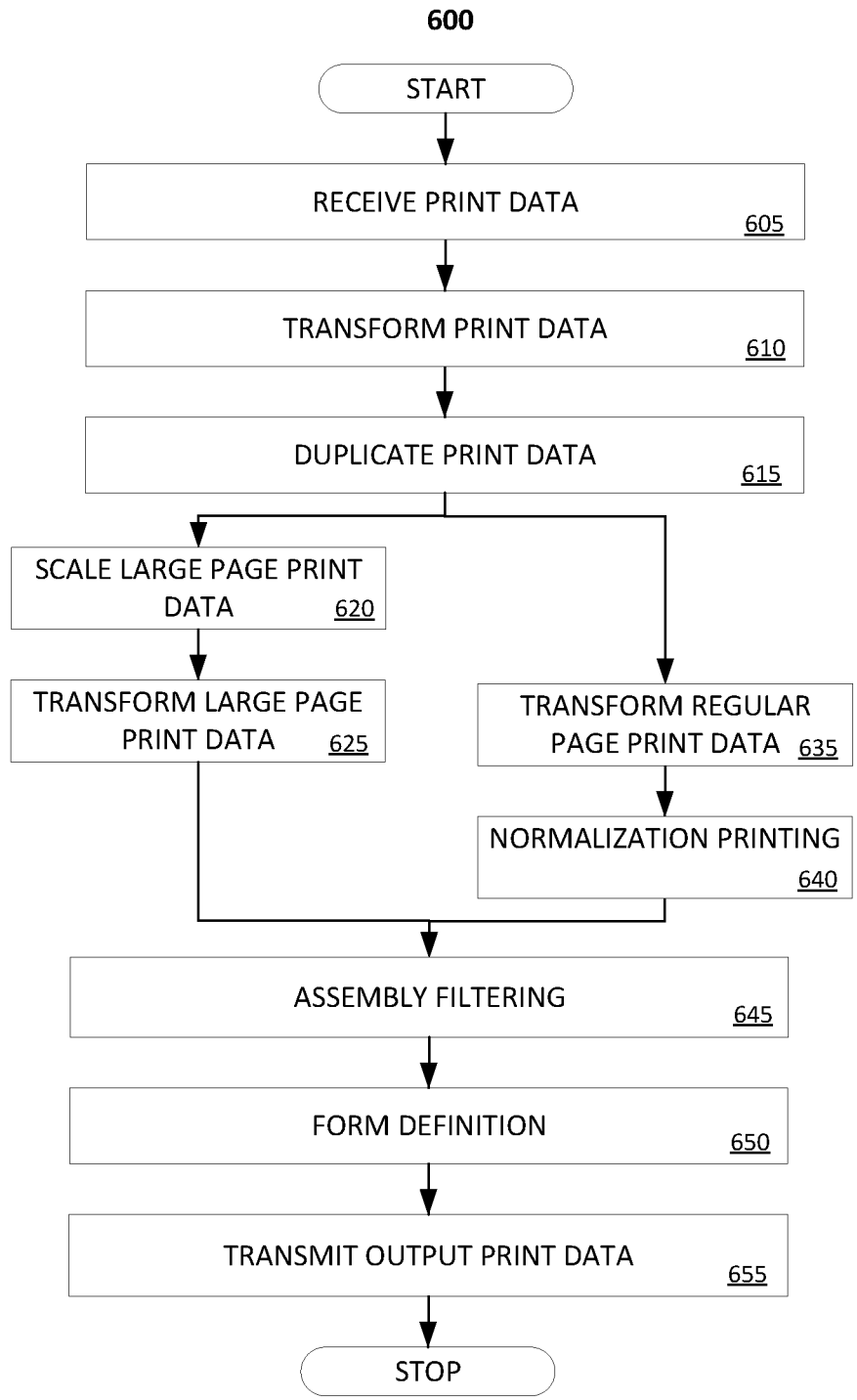
FIG. 6 is a flow diagram illustrating one embodiment of a process for processing documents having alternative media sizes.

FIG. 6 is a flow diagram illustrating one embodiment of a process 600 for processing documents having alternative media sizes. Process 600 may be performed by processing logic that may comprise hardware (e.g., circuitry, dedicated logic, programmable logic, etc.), software (such as instructions run on a processing device), or a combination thereof. In one embodiment, process 600 may be performed by pooling mechanism 110. The process 600 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

Process 600 begins at processing block 605, original print data is received. As discussed above, the original print data comprises AFP print data. At processing block 610, a transform is performed to convert the AFP print data to a PDF format. At processing block 615, the print data is duplicated to generate the large page print data and the regular page print data. Subsequently, large page processing and regular page processing is performed. In one embodiment, large page processing and regular page processing are performed in parallel in order to reduce processing time.

Large page processing comprises scaling the large page print data (e.g., to 200%), processing block 620, and performing a transform on the scaled large page print data to convert the PDF data back to the AFP format, processing block 625. Regular page processing comprises performing the transform on the regular page print data to convert the PDF data back to the AFP format, processing block 635, and normalization filtering 240 is performed. As discussed above, normalization filtering removes blank page inserts from the regular page print data, as well as add blank pages to each document sheet to that ensure the page count is a multiple of 2n.

At processing block 645, assembly filtering is performed to assemble the large and regular pages into a final document. As mentioned above, assembly filtering comprises sequentially retrieving large pages from the large page print data and regular pages from the regular page print data and using the original AFP print data to manage assembly of an output print data. At processing bock 650, form definition is performed. At processing block 655, the output print data is transmitted (e.g., to printing system 150). FIG. 5C illustrates a result of process 600 in which regular pages and large pages have been included in the same document notices 1 and 2.

Figure 7:
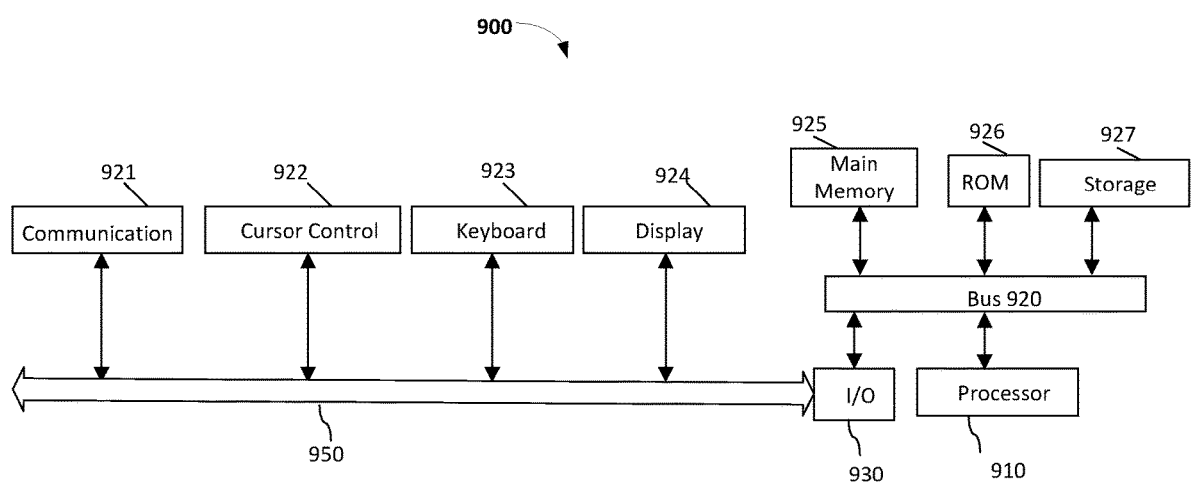
FIG. 7 illustrates a computing device suitable for implementing embodiments of the present disclosure.

FIG. 7 illustrates a computer system 900 on which computing device 120 may be implemented. Computer system 900 includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard (or alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Some embodiments pertain to Example 1 that includes at least one physical memory device to store a print workflow manager and one or more processors coupled with the at least one physical memory device to execute the print workflow manager to receive a print job including print data to be printed, wherein the print data comprises a first presentation format, convert the received print data from the first presentation format to generate second print data in a second presentation format, duplicate the second print data to generate third print data, process the second print data to generate data to be printed to a first page size and process the third print data to generate data to be printed to a second page size.

Example 2 includes the subject matter of Example 1, wherein the print workflow manager assembles the second print data and the third print data to generate output print data.

Example 3 includes the subject matter of Examples 1 and 2, wherein processing the third print data comprises scaling the third print data and converting the third print data from the second presentation format to the presentation format.

Example 4 includes the subject matter of Examples 1-3, wherein processing the second print data comprises converting the second print data from the second presentation format to the presentation format and filtering the second print data.

Example 5 includes the subject matter of Examples 1-4, wherein filtering the second print data comprises removing blank page inserts from the second print data.

Example 6 includes the subject matter of Examples 1-5, wherein filtering the second print data further comprises inserting blank pages to be printed into the second print data.

Example 7 includes the subject matter of Examples 1-6, wherein processing the second print data comprises converting the second print data from the second presentation format to the presentation format and filtering the second print data.

Example 8 includes the subject matter of Examples 1-7, wherein assembling the second data stream and the third data stream comprises retrieving page group structured fields from the print data and inserting the page group structured fields into the output print data to delimit boundaries.

Example 9 includes the subject matter of Examples 1-8, wherein the print workflow manager transmits the output data.

Example 10 includes the subject matter of Examples 1-9, further comprising a printing system to print the output print data.

Some embodiments pertain to Example 11 that includes a method for processing print documents, comprising receiving a print job including print data to be printed, wherein the print data comprises a first presentation format, converting the received print data from the first presentation format to generate second print data in a second presentation format, duplicating the second print data to generate third print data, processing the second print data to generate data to be printed to a first page size and processing the third print data to generate data to be printed to a second page size.

Example 12 includes the subject matter of Example 11, further comprising assembling the second print data and the third print data to generate output print data.

Example 13 includes the subject matter of Examples 11 and 12, wherein processing the third print data comprises scaling the third print data and converting the third print data from the second presentation format to the presentation format.

Example 14 includes the subject matter of Examples 11-13, wherein processing the second print data comprises converting the second print data from the second presentation format to the presentation format and filtering the second print data.

Example 15 includes the subject matter of Examples 11-14, wherein filtering the second print data comprises removing blank page inserts from the second print data.

Example 16 includes the subject matter of Examples 11-15, wherein filtering the second print data further comprises inserting blank pages to be printed into the second print data.

Example 17 includes the subject matter of Examples 11-16, wherein processing the second print data comprises converting the second print data from the second presentation format to the presentation format and filtering the second print data.

Example 18 includes the subject matter of Examples 11-17, wherein assembling the second data stream and the third data stream comprises retrieving page group structured fields from the print data and inserting the page group structured fields into the output print data to delimit boundaries.

Some embodiments pertain to Example 19 that includes a computer-readable medium having stored thereon instructions that, when executed by one or more processors, cause the one or more processors to receive a print job including print data to be printed, wherein the print data comprises a first presentation format, convert the received print data from the first presentation format to generate second print data in a second presentation format, duplicate the second print data to generate third print data, process the second print data to generate data to be printed to a first page size and process the third print data to generate data to be printed to a second page size.

Example 20 includes the subject matter of Example 19, having stored thereon instructions that, when executed by one or more processors, cause the one or more processors to assemble the second print data and the third print data to generate output print data and transmit the output data.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system comprising:
at least one physical memory device to store a print workflow manager; and
one or more processors coupled with the at least one physical memory device to execute the print workflow manager to receive a print job including print data to be printed, wherein the print data comprises a first presentation format, convert the received print data from the first presentation format to generate second print data in a second presentation format, duplicate the second print data to generate third print data, process the second print data to generate data to be printed to a first page size and process the third print data to generate data to be printed to a second page size.

2. The system of claim 1, wherein the print workflow manager assembles the second print data and the third print data to generate output print data.

3. The system of claim 2, wherein processing the third print data comprises scaling the third print data and converting the third print data from the second presentation format to the presentation format.

4. The system of claim 3, wherein processing the second print data comprises converting the second print data from the second presentation format to the presentation format and filtering the second print data.

5. The system of claim 4, wherein filtering the second print data comprises removing blank page inserts from the second print data.

6. The system of claim 5, wherein filtering the second print data further comprises inserting blank pages to be printed into the second print data.

7. The system of claim 6, wherein processing the second print data comprises converting the second print data from the second presentation format to the presentation format and filtering the second print data.

8. The system of claim 7, wherein assembling the second print data and the third print data comprises retrieving page group structured fields from the print data and inserting the page group structured fields into the output print data to delimit boundaries.

9. The system of claim 2, wherein the print workflow manager transmits the output data.

10. The system of claim 9, further comprising a printing system to print the output print data.

11. A method for processing print documents, comprising:
receiving a print job including print data to be printed, wherein the print data comprises a first presentation format;
converting the received print data from the first presentation format to generate second print data in a second presentation format;
duplicating the second print data to generate third print data;
processing the second print data to generate data to be printed to a first page size; and
processing the third print data to generate data to be printed to a second page size.

12. The method of claim 11, further comprising assembling the second print data and the third print data to generate output print data.

13. The method of claim 12, wherein processing the third print data comprises:
scaling the third print data; and
converting the third print data from the second presentation format to the presentation format.

14. The method of claim 13, wherein processing the second print data comprises:
converting the second print data from the second presentation format to the presentation format; and
filtering the second print data.

15. The method of claim 14, wherein filtering the second print data comprises removing blank page inserts from the second print data.

16. The method of claim 15, wherein filtering the second print data further comprises inserting blank pages to be printed into the second print data.

17. The method of claim 16, wherein processing the second print data comprises:
converting the second print data from the second presentation format to the presentation format; and
filtering the second print data.

18. The method of claim 17, wherein assembling the second print data and the third print data comprises retrieving page group structured fields from the print data and inserting the page group structured fields into the output print data to delimit boundaries.

19. A non-transitory computer-readable medium having stored thereon instructions that, when executed by one or more processors, cause the one or more processors to:
receive a print job including print data to be printed, wherein the print data comprises a first presentation format;
convert the received print data from the first presentation format to generate second print data in a second presentation format;
duplicate the second print data to generate third print data;
process the second print data to generate data to be printed to a first page size; and
process the third print data to generate data to be printed to a second page size.

20. The non-transitory computer-readable medium of claim 19, having stored thereon instructions that, when executed by one or more processors, cause the one or more processors to: assemble the second print data and the third print data to generate output print data; and transmit the output data.

* * * * *